No. 714,155. Patented Nov. 25, 1902.
A. G. DAVIS.
SYSTEM OF ELECTRICAL DISTRIBUTION.
(Application filed June 25, 1897.)

(No Model.) 2 Sheets—Sheet 1.

Witnesses
Inventor
Albert Gould Davis

UNITED STATES PATENT OFFICE.

ALBERT GOULD DAVIS, OF WASHINGTON, DISTRICT OF COLUMBIA, ASSIGNOR TO THE GENERAL ELECTRIC COMPANY, A CORPORATION OF NEW YORK.

SYSTEM OF ELECTRICAL DISTRIBUTION.

SPECIFICATION forming part of Letters Patent No. 714,155, dated November 25, 1902.

Application filed June 25, 1897. Serial No. 642,240. (No model.)

*To all whom it may concern:*

Be it known that I, ALBERT GOULD DAVIS, a citizen of the United States, residing at Washington, in the District of Columbia, have invented certain new and useful Improvements in Systems of Electrical Distribution, (Case No. 9,) of which the following is a specification.

My invention relates to systems of distribution of the alternating-current type, and it is particularly useful in connection with single-phase systems, though it is applicable to any alternating system whatever.

My invention has for its object to increase the number of phases of any alternating current, and I particularly describe and illustrate herein that embodiment of my invention by means of which a two-phase current may be obtained from an ordinary single-phase system.

Briefly stated, my invention may be said to comprise an alternating-current system having a plurality of branch circuits leading from the mains thereof, in combination with an electrodynamic phase-modifier constructed and arranged to act upon one or more of the said branch circuits, so as to produce a phase displacement between the currents flowing therein.

It also comprises a novel construction of the electrodynamic phase-modifier, together with various details of construction and arrangement to be hereinafter particularly pointed out and claimed.

Figure 1:
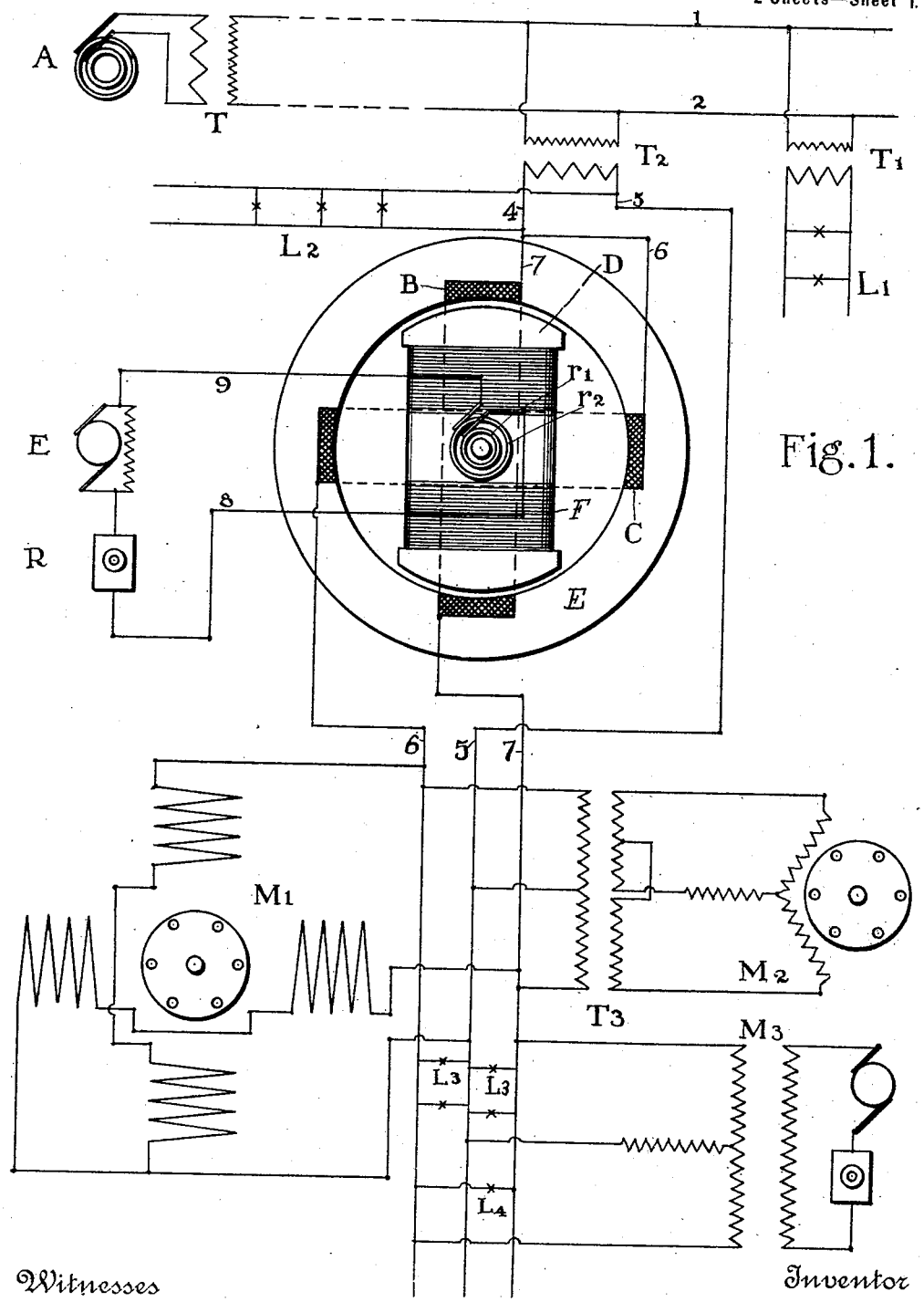
Figure 2:
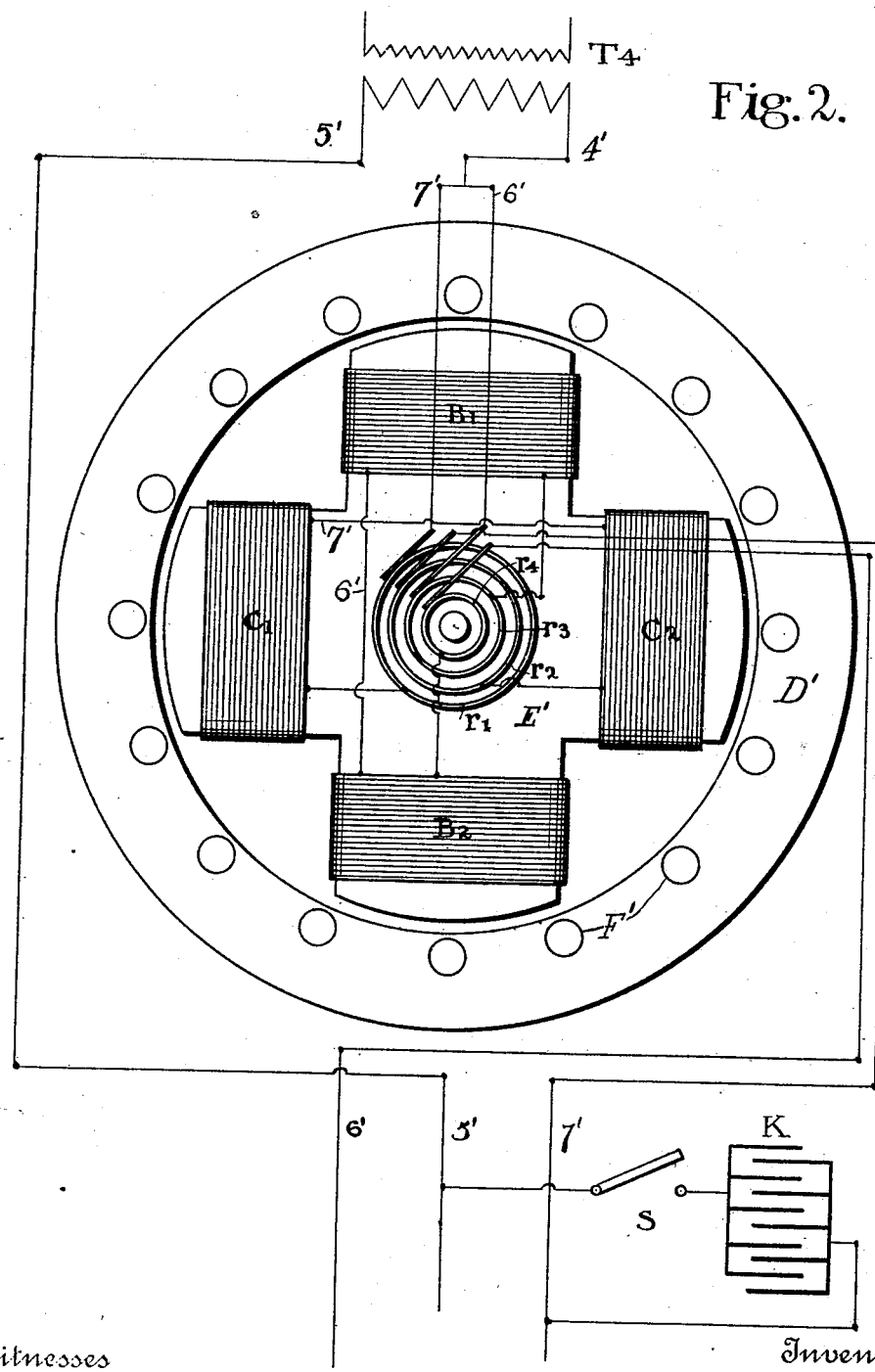

In the drawings attached to this specification, Figure 1 is a general view of a system of distribution embodying one form of my invention, and Fig. 2 is a view of a modified form.

Referring more particularly to Fig. 1, A represents a single-phase alternating generator feeding, through the step-up transformer T, if preferred, the single-phase distribution system 1 2. Connected to the mains of this system are shown various transformers T' T². At points where single-phase translating devices only are required—as, for instance, at the transformer T'—the arrangements are those usual in single-phase systems. I have shown lamps L' in multiple with the secondary mains of the transformer T'. I have also shown lamps L² in multiple with the secondary mains 4 5 of the transformer T², and at points where multiphase translating devices are required I provide branch circuits 6 7, preferably from the secondary mains. These branch circuits 6 7 are shown as passing through windings C B on the primary member E of an electrodynamic phase-modifier, each branch circuit including one of the windings of the phase-modifier. From these windings the circuits lead through various translating devices to the wire 5 and back to the source of electromotive force. The conductors 5, 6, and 7 beyond the phase-modifier constitute what may be termed a "distribution" system, since it is to these conductors that the translating devices are connected.

The electrodynamic phase-modifier consists of two relatively rotatable members D E. The member E is shown as consisting of a soft-iron ring wound with the angularly-displaced windings B C. The member D, in this case the rotor, is wound with the direct-current winding F, excited in any preferred way, as by the direct-current exciter E, controlled by the rheostat R, which supplies current through the wires 8 9 and the rings $r'$ $r^2$ to the winding F.

The action of the device shown is as follows: The resultant polar line of the windings B and C is in advance of one of the said windings and behind the other. It therefore follows that when the direct-current member D is properly excited and driven at synchronous speed either by external power or by the action of the resultant magnetic field of B C the electromotive forces induced in these two coils by the action of the direct-current member D will be displaced in phase. It therefore follows that each of the electromotive forces between 6 and 5 and 7 and 5 at points beyond the phase-modifier is the resultant of the original electromotive force and the electromotive force of one of the coils B C; but these last-named electromotive forces are displaced in phase, one being behind the original electromotive force and the other in advance of it. It is possible to so proportion and adjust the windings B C and the direct-current member D as to give the resultant electromotive forces any desired displacement. In the form shown the phase displacement is ninety degrees and the wires 5 6 7 form an interconnected two-phase system. I have shown connected to this system various translating devices, as the lamps $L^3$ $L^4$ and the motors $M'$ $M^2$ $M^3$.

The motor $M'$ is an ordinary two-phase induction-motor and need not be particularly described. $M^2$ is a three-phase induction-motor fed through the Scott transformer $T^3$. $M^3$ is a two-phase synchronous motor with a separate exciter and rheostat.

While I have illustrated single-phase translating devices in connection with the mains 5 6 7, I prefer in general to connect the single-phase translating devices either to separate transformers, as $T'$, or to the mains 4 5, as shown at $L'$ $L^2$, as in this relation they do not tend to unbalance the system.

Fig. 2 illustrates another form which my invention may take. In this figure the wires $4'$ $5'$ lead, as before, from the source of single-phase current $T^4$. From $4'$ two wires $6'$ $7'$ lead through the electrodynamic phase-modifier to the distribution system. In this form the phase-modifier consists of two relatively rotatable members $E'$ $D'$. The member $D'$ consists of a ring wound with the short-circuited winding $F'$. The member $E'$ consists of a structure wound with four coils $B'$ $B^2$ $C'$ $C^2$. The wire $7'$ leads from $4'$ through the ring $r'$ to the coil $C'$, coil $C^2$, ring $r^2$, and thence to the distribution system. The wire $6'$ leads from $4'$ through ring $r^3$, coil $B'$, coil $B^2$, ring $r^4$, and out to the system.

It is obvious that this apparatus will operate when once started as a single-phase induction generator or motor, according to whether or not it is supplied with external power. The electromotive forces or counter electromotive forces of the windings B and C will be dephased, as in the form shown in Fig. 1, and a two-phase current will result.

In order to start the machine, I have shown a condenser K, in series with the switch S, in multiple with one of the windings of the phase-modifier. The action of this condenser is to cause a rotary field in the member $E'$ sufficient to start the modifier. When proper speed is attained, the switch S is opened and the device runs as described.

It will be seen that I have thus provided a simple and efficient means for increasing the number of phases of electromotive force across any two means of a distribution system. I also provide a means by which multiphase current may be derived from any ordinary single-phase distribution system.

I do not restrict myself to the specific forms shown and described, as it is evident that they may be greatly varied without departing from the spirit and scope of my invention.

I do not claim in this application the novel method disclosed herein, since this method constitutes the subject-matter of a divisional application, Serial No. 103,548, filed April 18, 1902.

What I claim as my invention, and desire to secure by Letters Patent of the United States, is—

1. The combination with an alternating-current system, of a plurality of branch circuits from the mains of said system, and electrodynamic means for dephasing the currents in each of said branch circuits, substantially as described.

2. The combination with an alternating-current system, of a plurality of branch circuits upon which are primarily impressed electromotive forces of the same phase, and an electrodynamic phase-modifier connected to said branch circuits, and arranged to advance the current in one of said branch circuits, and to retard the current in the other of said branch circuits, substantially as described.

3. In combination, a source of single-phase electromotive force, a conductor leading from one of the terminals of said source to one of the mains of a distribution system, a plurality of angularly-displaced windings connected at one end to the other terminal of said source, and at the other end to the other mains of the distribution system, and a secondary member capable of rotation relatively to said windings.

4. In combination, a source of single-phase electromotive force, a conductor leading from one of the terminals of said source to one of the mains of a distribution system, a phase-modifier comprising a plurality of windings with means for producing electromotive forces of displaced phase in said windings, and conductors leading from the other terminal of said source through said windings to the other mains of the distribution system.

5. In combination, a pair of single-phase mains, a phase-modifier comprising a plurality of angularly-displaced primary windings with a secondary member capable of rotation relatively to said windings, and branch circuits connecting translating devices to said mains, each branch circuit including one of the angularly-displaced windings of the phase-modifier.

6. In combination, a pair of single-phase mains, a phase-modifier comprising a plurality of windings with means for producing electromotive forces of displaced phase in said windings, and branch circuits connecting translating devices to said mains, each branch circuit including one of the windings of the phase-modifier.

7. An electrodynamic phase-modifier, comprising angularly-displaced windings, each in multiple with a pair of single-phase mains and in series with the work, a relatively rotatable secondary member provided with a short-circuited winding, and a branch circuit for starting, containing a phase-modifying device shunted around one of said angularly-displaced windings.

8. An electrodynamic phase-modifier comprising two angularly-displaced windings each in multiple with a pair of single-phase mains, and in series with the translating devices, and the relatively rotatable secondary member.

9. The combination with the mains of a single-phase system, of a phase-modifier provided with two circuits, each in multiple with the mains, and in series with the work.

Signed at Washington, District of Columbia, this 22d day of June, A. D. 1897.

ALBERT GOULD DAVIS.

Witnesses:
  W. H. DAVIS,
  C. A. NEALE.